(12) United States Patent
Koehler

(10) Patent No.: US 8,113,992 B2
(45) Date of Patent: Feb. 14, 2012

(54) ROPE TENSIONING DEVICE FOR ROPE NETWORKS

(75) Inventor: Karl-Heinz Koehler, Berlin (DE)

(73) Assignee: Berliner Seilfabrik GmbH & Co., Berlin (DE)

( * ) Notice: Subject to any disclaimer, the term of this patent is extended or adjusted under 35 U.S.C. 154(b) by 871 days.

(21) Appl. No.: 11/911,390

(22) PCT Filed: Apr. 13, 2006

(86) PCT No.: PCT/EP2006/003784
§ 371 (c)(1), (2), (4) Date: Mar. 27, 2008

(87) PCT Pub. No.: WO2006/108715
PCT Pub. Date: Oct. 19, 2006

(65) Prior Publication Data
US 2009/0212146 A1    Aug. 27, 2009

(30) Foreign Application Priority Data

| Apr. 13, 2005 | (DE) | 10 2005 017 774 |
| Apr. 13, 2005 | (DE) | 20 2005 006 174 U |
| Jun. 3, 2005 | (DE) | 10 2005 026 412 |
| Jun. 3, 2005 | (DE) | 20 2005 009 003 U |
| Mar. 22, 2006 | (DE) | 20 2006 004 853 U |

(51) Int. Cl.
    *A63B 9/00* (2006.01)
(52) U.S. Cl. .......... 482/35; D21/814
(58) Field of Classification Search .......... 482/23, 482/24, 35, 36, 37, 38; 135/97, 98, 121, 135/123; 52/648.1; D21/814, 823, 826; 254/231, 234; 212/174
See application file for complete search history.

(56) References Cited

U.S. PATENT DOCUMENTS

| 1,426,337 | A | * | 8/1922 | Sperry | 455/97 |
| 3,970,301 | A | * | 7/1976 | Lehmann | 482/35 |
| 4,084,812 | A | * | 4/1978 | Melrose et al. | 472/118 |
| 4,158,255 | A | * | 6/1979 | Doll et al. | 29/428 |
| 4,278,250 | A | * | 7/1981 | Baynes et al. | 482/36 |
| 5,000,211 | A | * | 3/1991 | Speare et al. | 135/97 |
| 6,095,950 | A | * | 8/2000 | Katz | 482/35 |
| 7,175,162 | B1 | * | 2/2007 | Ratcliff | 254/231 |
| 2009/0078148 | A1 | * | 3/2009 | Cylvick | 104/53 |

FOREIGN PATENT DOCUMENTS

| DE | 295 16 449 U1 | | 12/1995 |
| WO | PCT/AU93/00619 | * | 6/1994 |
| WO | 03/063968 A | | 8/2003 |

* cited by examiner

Primary Examiner — Loan Thanh
Assistant Examiner — Tam Nguyen
(74) Attorney, Agent, or Firm — Norris, McLaughlin & Marcus, P.A.

(57) ABSTRACT

The invention relates to a rope-tensioning device for rope networks. The object of the invention is to develop a tensioning device, in particular for rope networks, with a tensioning mechanism which is arranged outside of areas accessible to players and which is covered completely or to a significant part. Maintenance of the tensioning device and operation of the tensioning mechanism should not be limited. The rope tensioning device for rope networks of the invention is characterized by a rope tensioner for rope networks arranged to the greatest extent possible inside a short section of pipe (pipe section). Advantageously, a pipe element with the rope tensioner can be combined with different framework elements, such as support masts, center masts, framework nodes and mounting devices located close to the ground.

14 Claims, 11 Drawing Sheets

ROPE TENSIONING DEVICE FOR ROPE NETWORKS

The invention relates to a rope tensioning device for rope networks.

Two-dimensional and three-dimensional networks of rope netting in combination with variable framework systems have been successfully employed in the design of playgrounds. These networks are suitable for configuring different play worlds with three-dimensional structures that encourage children to exercise.

The networks composed of different ropes are tensioned inside a predefined framework system, wherein the framework attains significant design flexibility when the individual framework rods are connected by spherical hollow bodies, allowing the creation of many interesting geometrically shapes. The rope networks are attached and tensioned inside the frameworks with the help of mounts disposed on or in the hollow spherical bodies and on the framework rods.

Tensioning points are, in particular, nodes of a framework, top points of support masts, and foot points (tensioning points in the region of the ground attachments).

In particular designs of rope network structures, the ropes are oriented in space and tensioned, starting from the support masts, for example the center masts. Tensioning of the main ropes, which extend from the top of a center mast to the ground where they are anchored, poses a particular problem. To tension the ropes, the rope ends are typically pressed together to form eyelets and attached with shackles and tensioned with external tensioning devices. However, the use of tensioning elements which are placed externally and exposed to weather and corrosion has major disadvantages. Moreover, these tensioning elements are partially located in the ground, in sand, gravel or other materials provided as protection against a fall. Access is made particularly difficult if a compound layer of the rubber particles is applied as protection against a fall. Maintenance and potentially required re-tensioning of the network structure then becomes very difficult and is often avoided. This may represent a risk, making play on the equipment less safe.

It is therefore an object of the invention to provide a rope tensioning device, in particular for rope networks, with a tensioning mechanism which is arranged outside the space accessible to the players and which is covered either completely or at least partially. This should remove limitations placed on the maintenance of the tensioning device and operation of the tensioning mechanism.

The object is solved with the features of claim 1.

The solution of the object of the invention is provided by a rope tensioning device for rope networks which is characterized in that a rope tensioner for ropes of the rope network is disposed mainly in an interior space of a short section of pipe (pipe section).

Advantageously, the pipe section of the invention can be combined with different framework elements, for example support masts, center masts, framework nodes and mounting devices near the ground.

Advantageous embodiments are recited in the dependent claims.

According to one embodiment of the invention, the rope tensioner includes a support, a rotationally supported tensioning rod extending through the support, and a rope receiving member movably arranged on the tensioning rod.

According to another embodiment, elements of the rope tensioner are arranged outside the pipe section near an end of the pipe section.

Another embodiment is characterized in that the support is placed external to the pipe section and secured on the end of the pipe section.

According to another embodiment, a tensioning element of the tensioning rod is arranged external to the pipe section.

Another embodiment is characterized in that the tensioning rod includes a thread, on which the rope receiving member, which includes an interior thread, can be rotatably attached.

Another embodiment is characterized in that the rope receiving member includes fastening elements for the ends of the ropes.

According to another embodiment, the support is attached on the interior wall of a hollow body placed on the pipe section, wherein the tensioning rod extends through the hollow body and the tensioning element of the tensioning rod is arranged so that it can be operated outside the hollow body.

According to another embodiment of the invention, the end of the pipe section is covered with a hollow body having rope openings, wherein the hollow body is made as a single part or assembled from several parts.

According to yet another advantageous embodiment, the rope tensioner includes a rope receiving member, a tensioning rod with a tensioning member extending through the rope receiving member and rotatably mounted therein, and a mounting plate attached in an interior space of the pipe section and including a bore with an interior thread, into which bore the tensioning rod having an interior thread can be rotatably screwed.

Another embodiment is characterized in that the rope tensioner includes a rope receiving member and a tensioning rod attached to the rope receiving member, wherein the tensioning element of the tensioning rod is arranged in a hollow body outside the interior space of the pipe section that is connected to the hollow body.

Another embodiment is characterized in that the hollow body includes a tensioning opening which can be closed with a cover. The tensioning mechanism of the device can be operated through this tensioning opening.

According to another embodiment, the ropes rest at the end of the pipe section on a pad which is gentle on the ropes (rope-protecting), thereby minimizing the loading effect on the ropes from the applied friction forces.

According to another embodiment of the invention, a rope tensioner for ropes of the rope network is arranged on a mast top of a center mast configured as a mast pole.

According to yet another embodiment of the invention, the rope tensioner includes a support placed on and attached to the mast top of the mast pole, with a tensioning rod having a movable rope receiving member arranged thereon and being rotatably supported in the support.

According to another embodiment of the invention, the rope tensioner includes a hollow body with rope openings placed on the mast top of the mast pole and secured thereon, and a tensioning rod extending vertically through the hollow body into the mast pole, with the rope receiving member being movably arranged on the tensioning rod and rotatably supported in the wall of the hollow body functioning as a counter support Another advantageous embodiment of the invention is characterized in that the tensioning rod of the rope tensioner is rotatably supported in a support element configured as a bracket, wherein a leg of the bracket is connected to the mast top. With this design, greater tensioning forces can be transferred to the ropes.

According to another embodiment of the invention, the mast top is covered with a hollow body.

The invention will now be described in more detail with reference to exemplary embodiments and the drawings.

Figure 3:
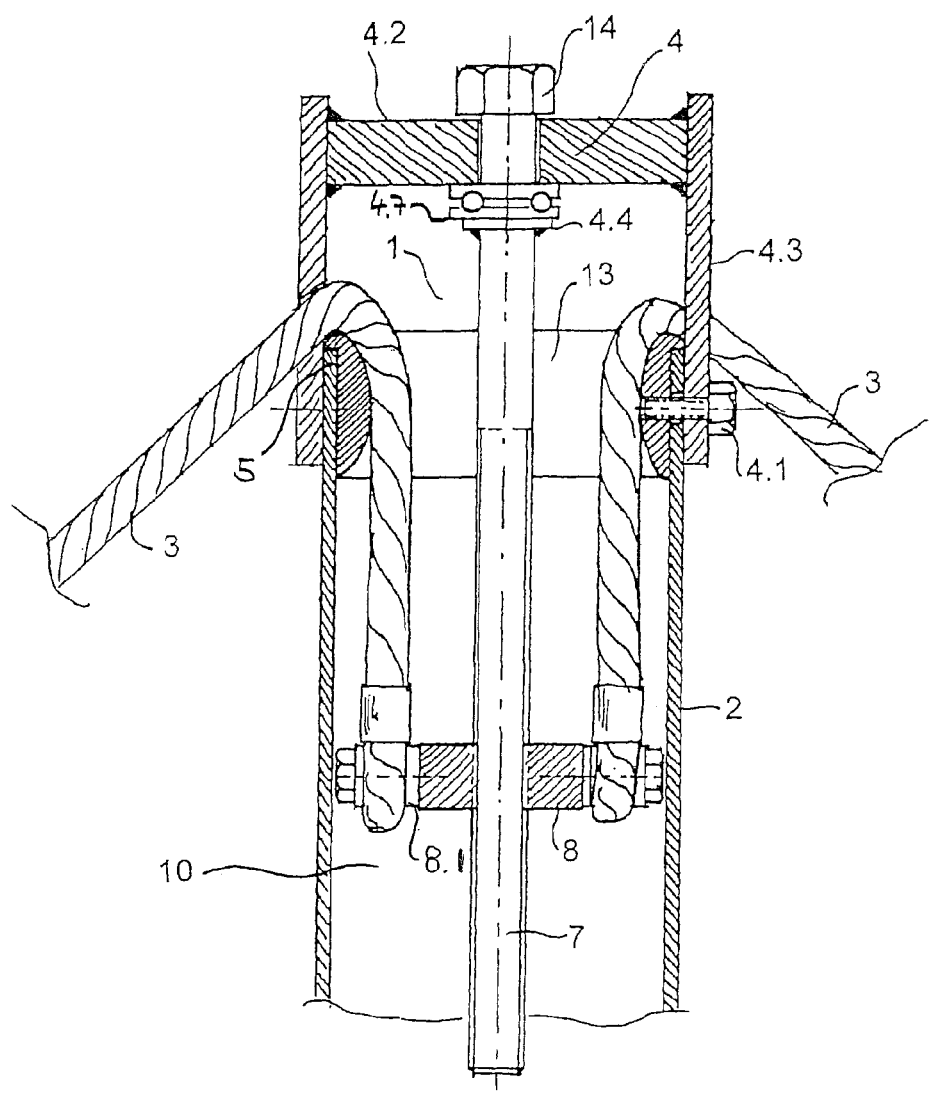
Figure 4:
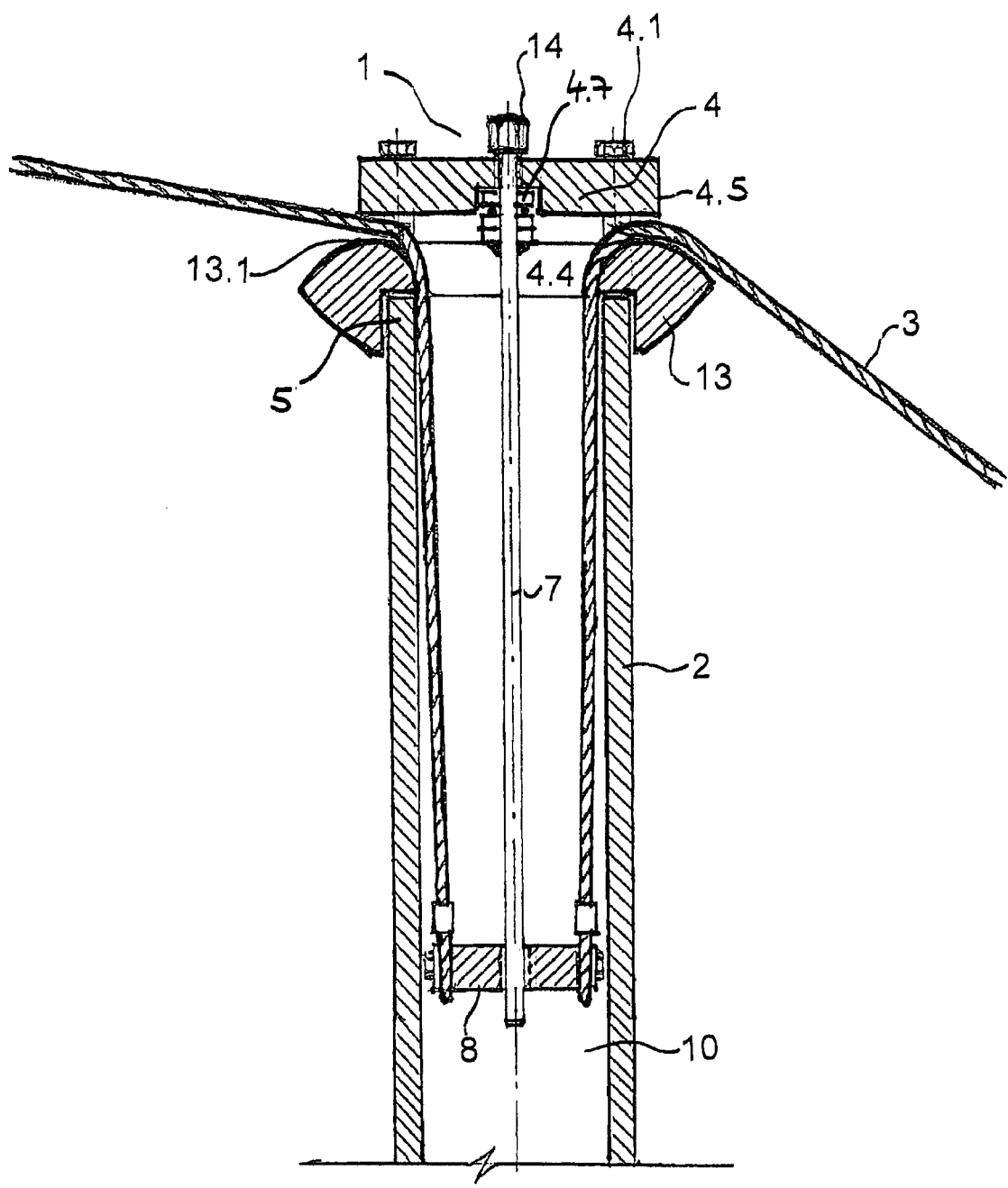
Figure 5:
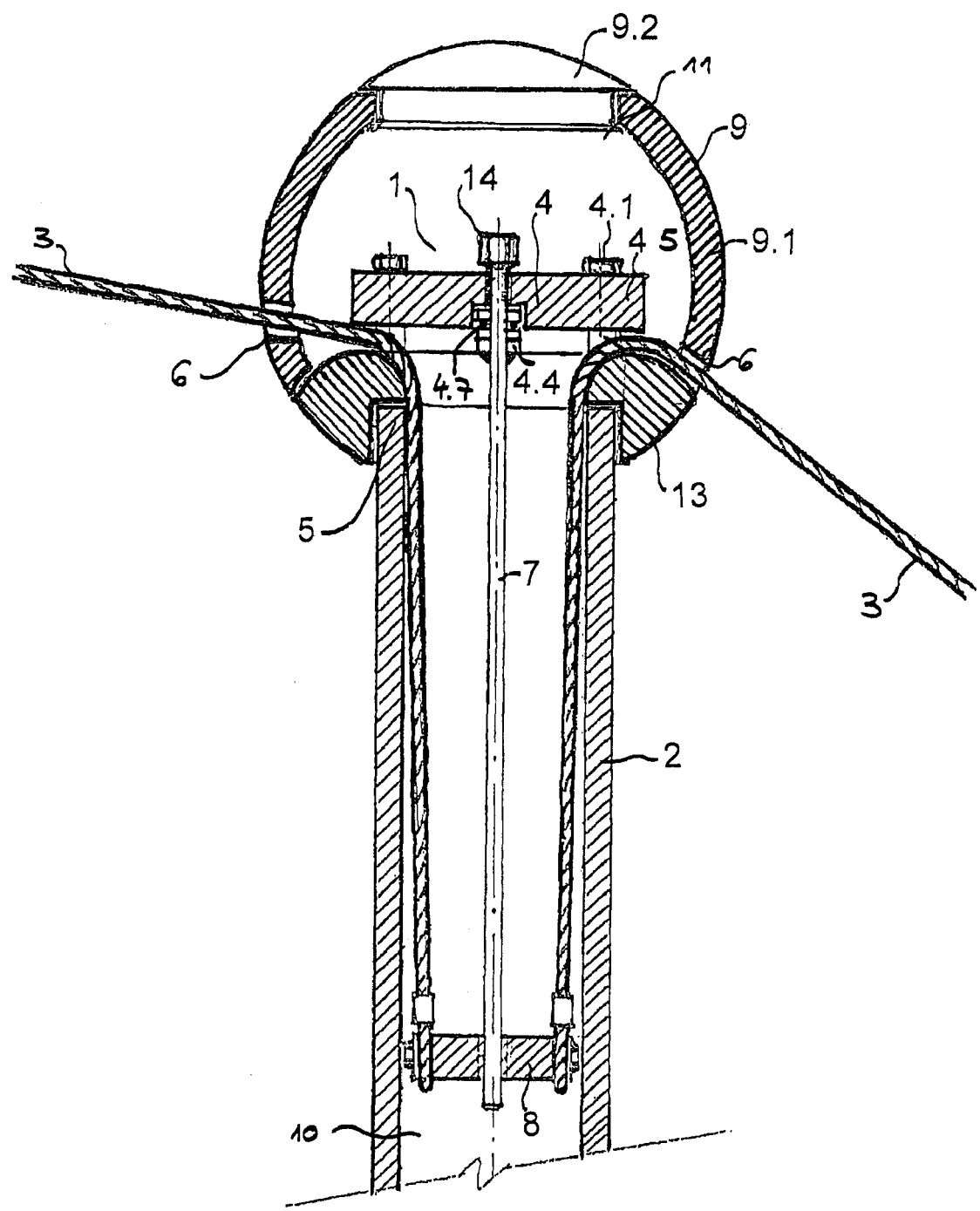
Figure 6:
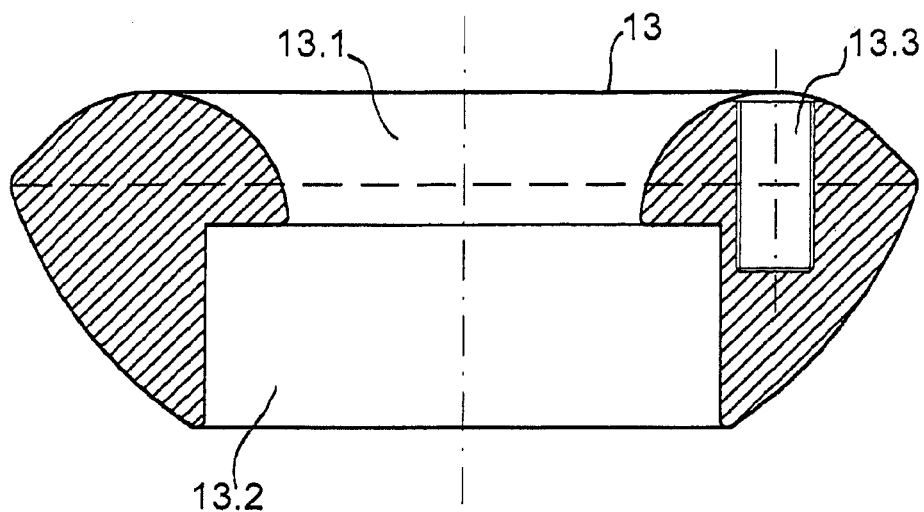
Figure 6:
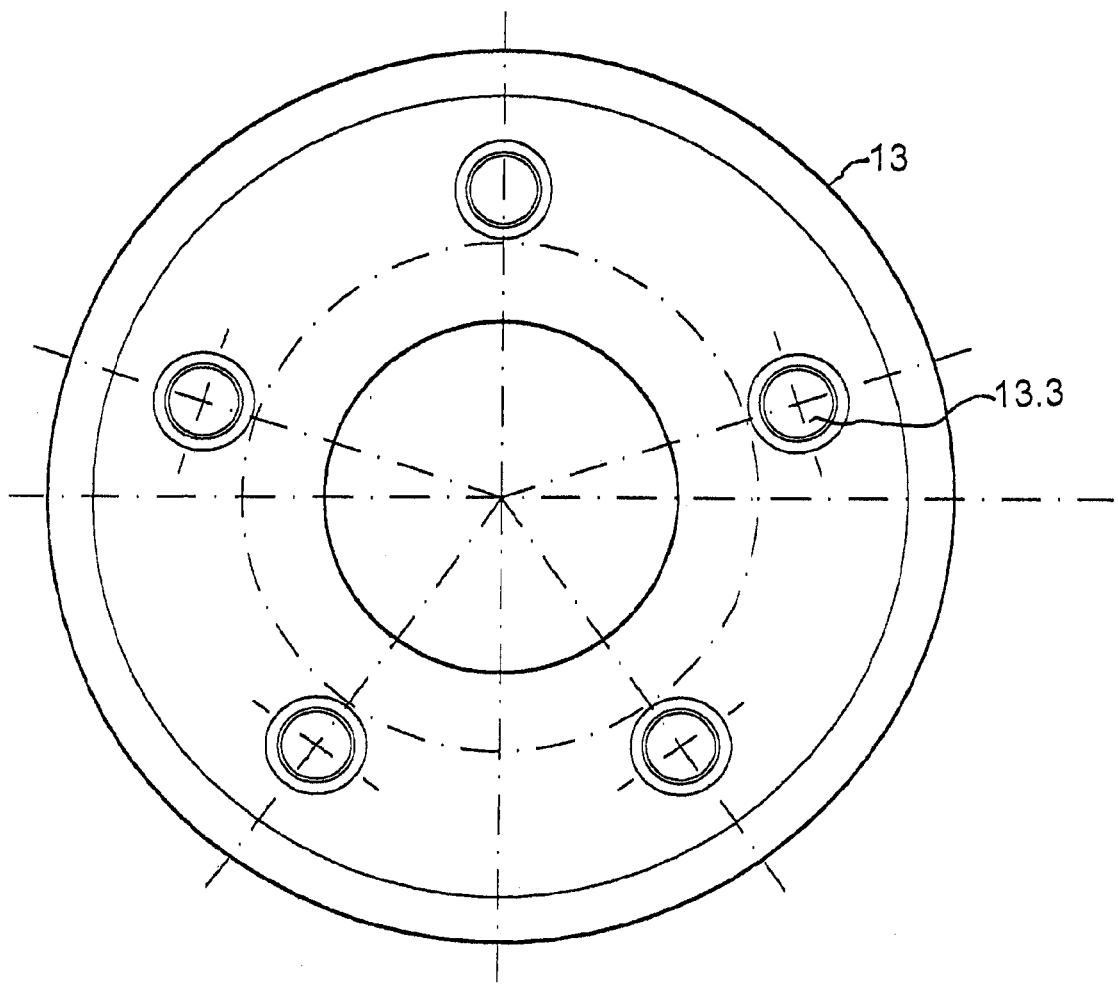
Figure 7:
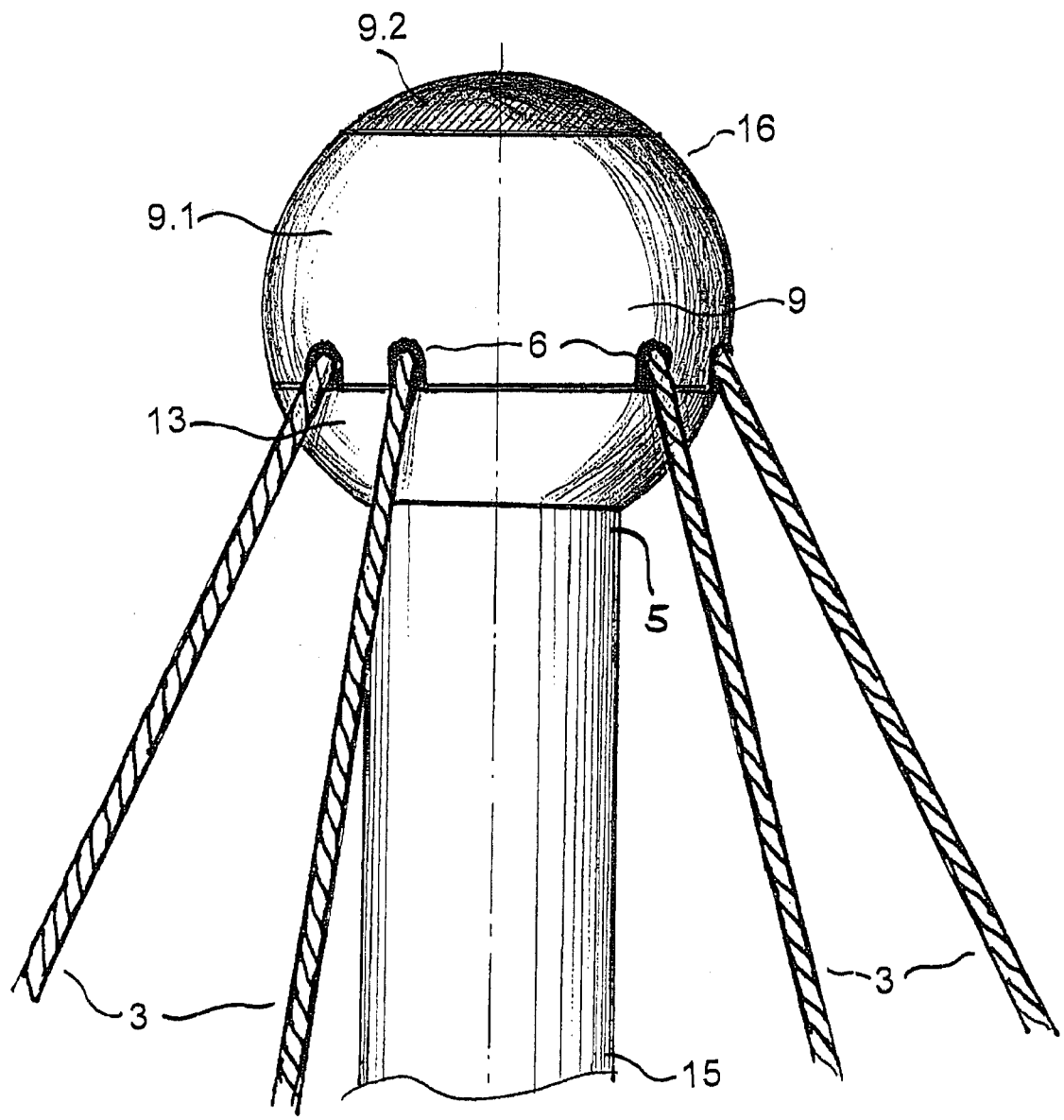
Figure 8:
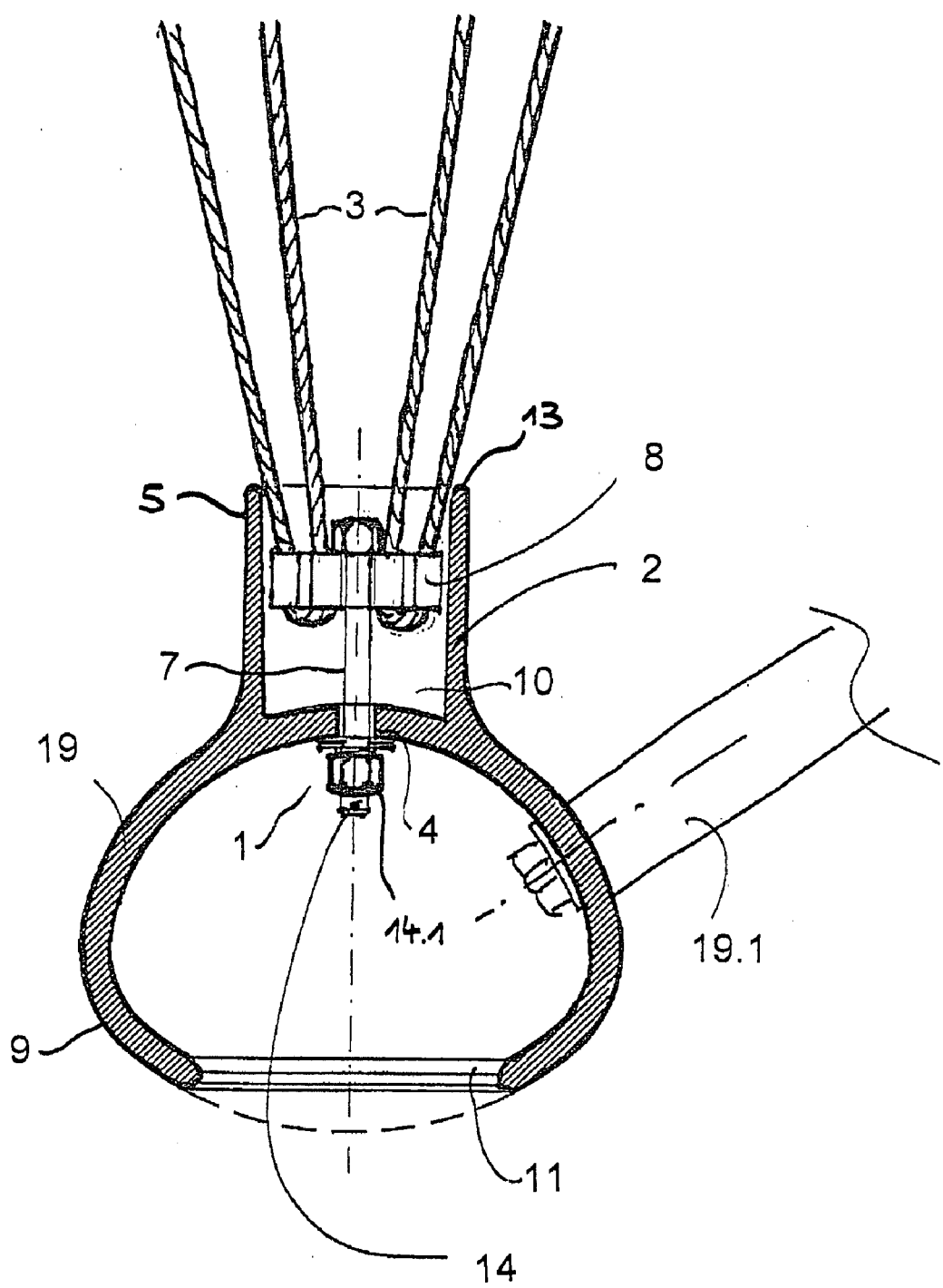
Figure 9:
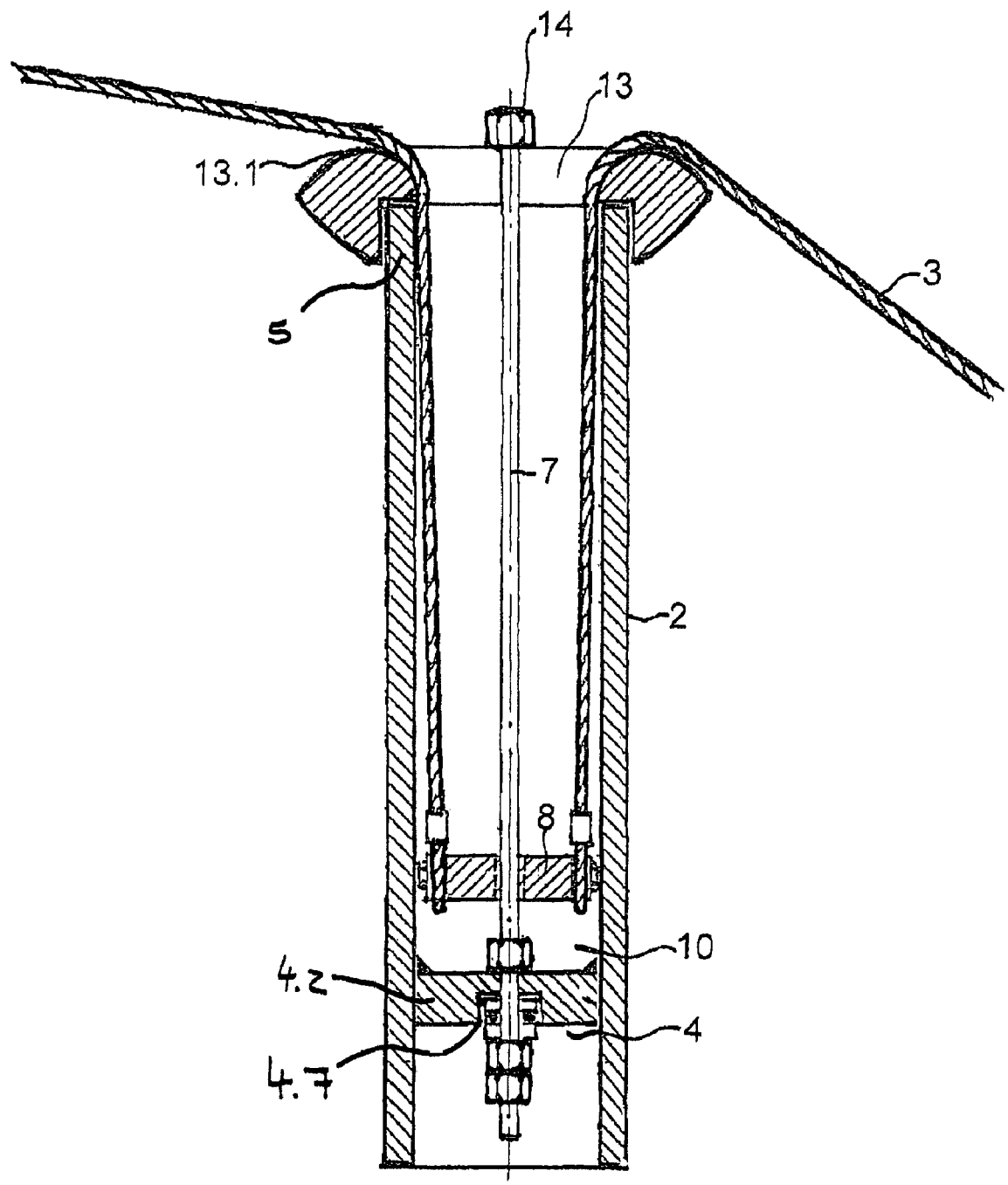
Figure 10:
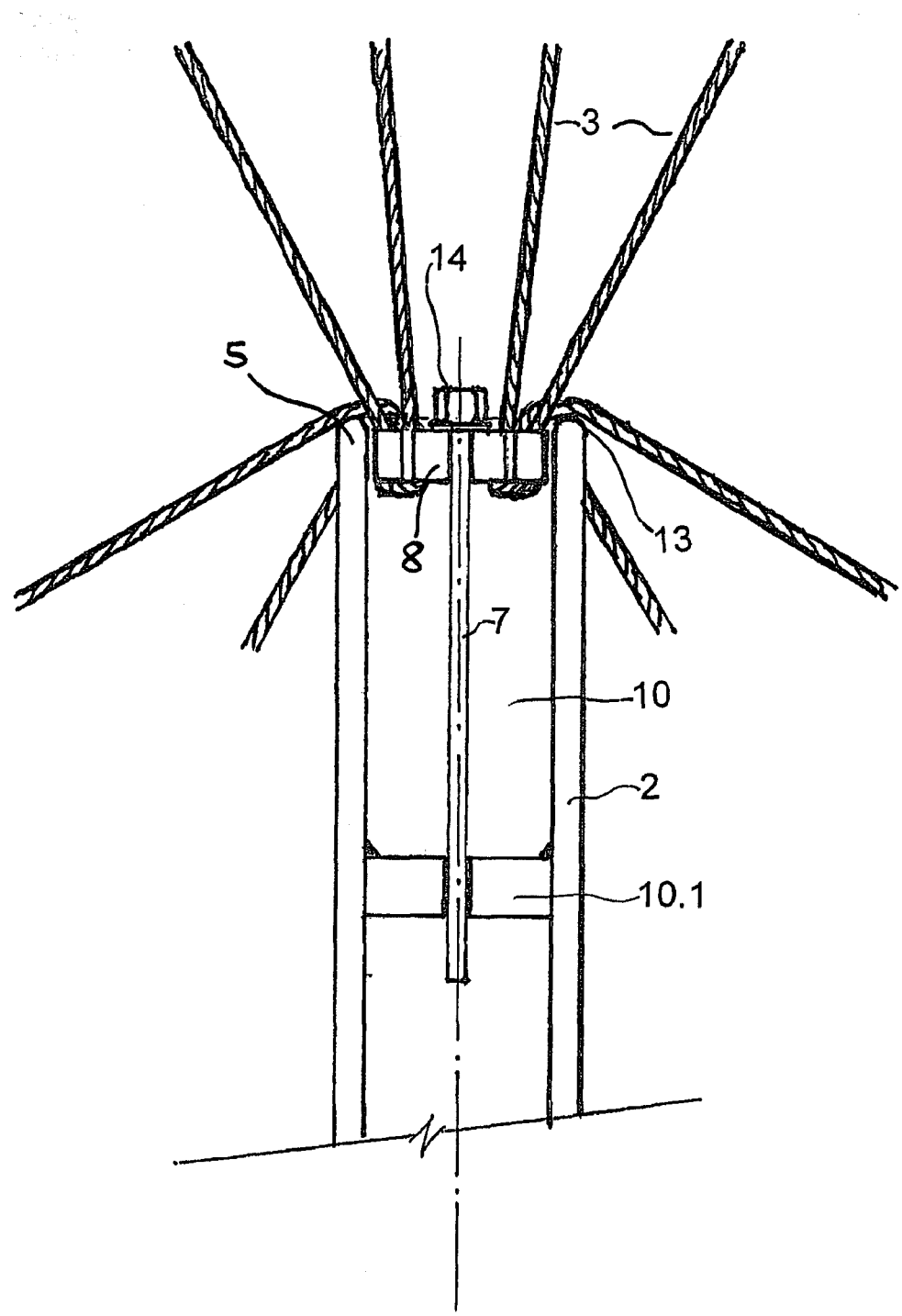
Figure 11:
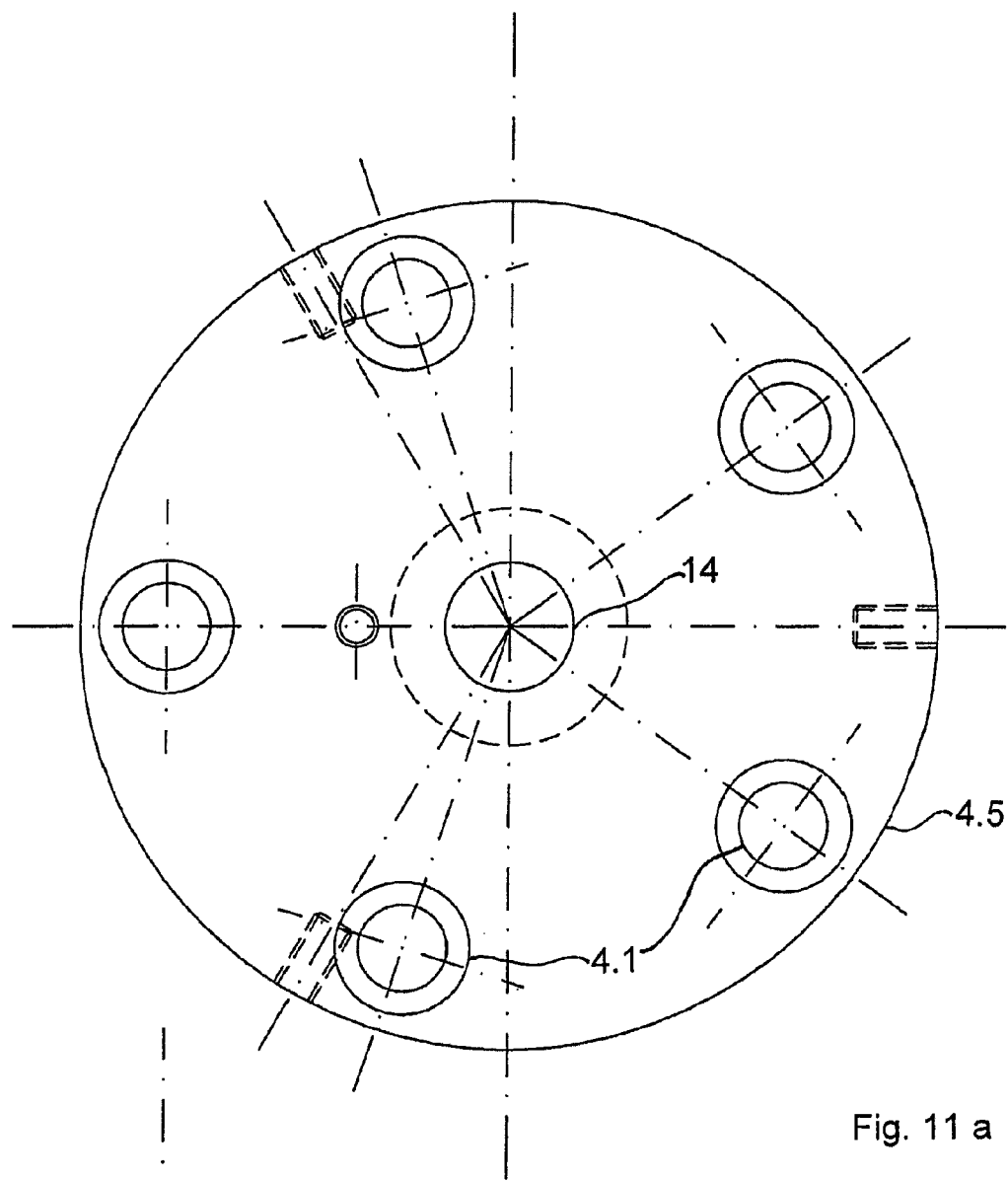
Figure 11:
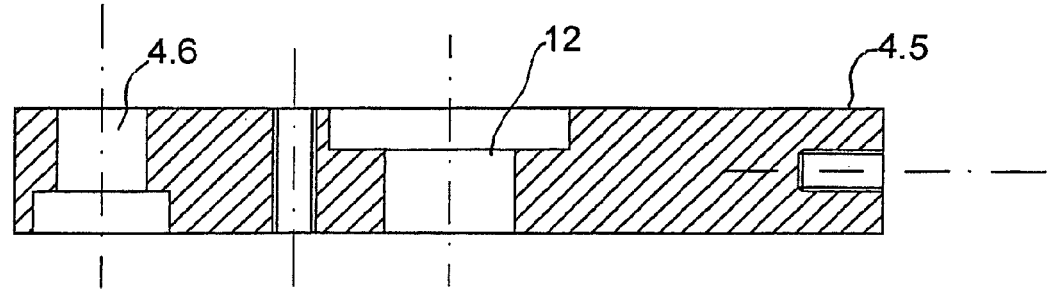

FIG. 3 is a cross-sectional view of a support and tensioning member arranged external to the pipe section, FIG. 4 is another diagram of the arrangement of a support, FIG. 5 is a diagram of a cover of the rope tensioner with a hollow sphere, FIGS. 6a+b illustrates in a cross-sectional view and a top view a rope-protecting support, FIG. 7 is a diagram of a cover for the hollow body of the rope tensioner and a top point of a support mast, FIG. 8 is a diagram of a frameworks point (node) with a rope tensioner, FIG. 9 is a schematic cross-sectional view of another arrangement of a rope tensioner in the pipe section, FIG. 10 is a cross-sectional view of another arrangement of a rope tensioner in the pipe section, and FIGS. 11a+b show a top view and a cross-section of a base plate receiving a support.

Figure 1:
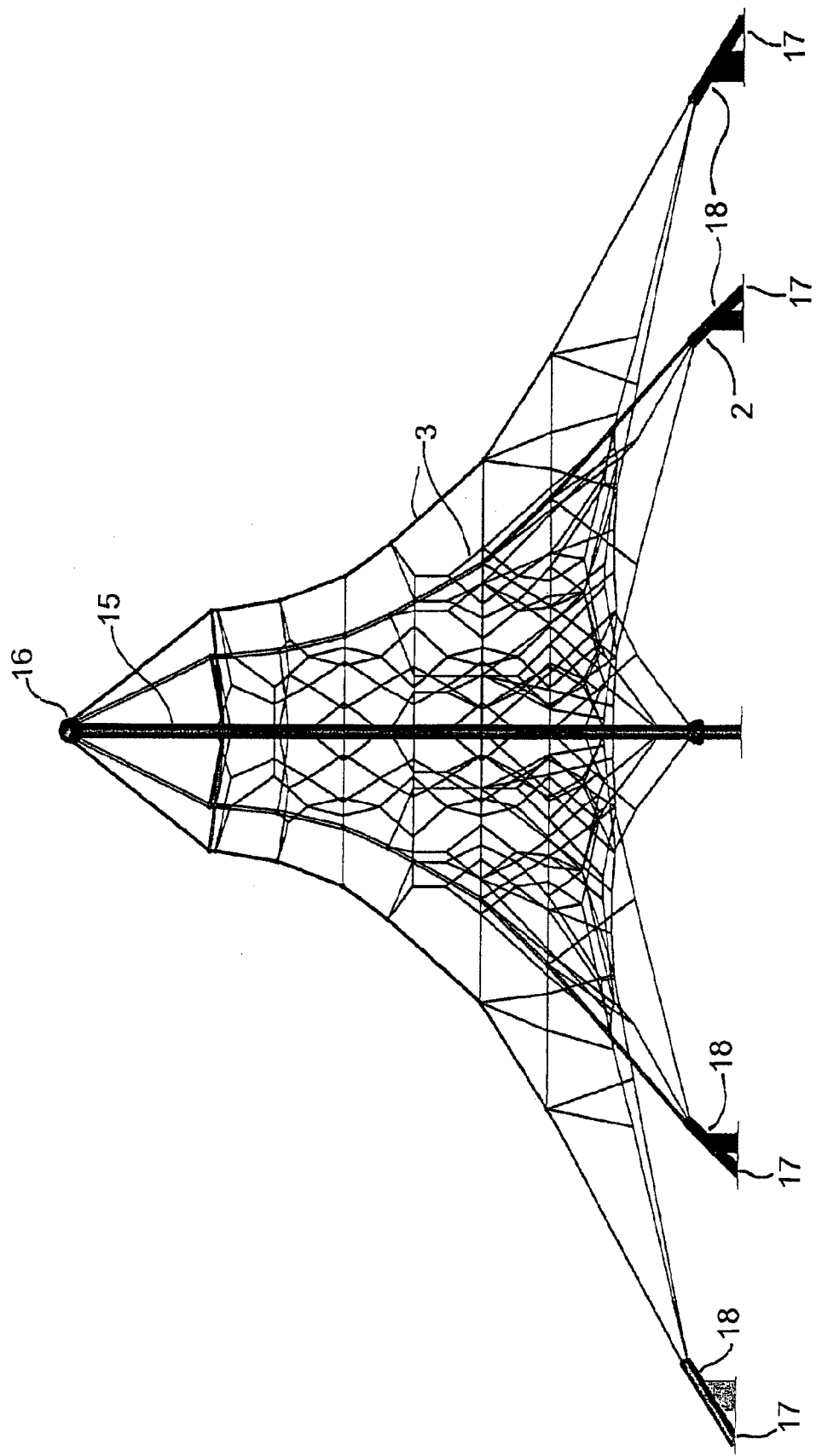
FIG. 1 shows a diagram of a three-dimensional rope network with a center mast.

FIG. 1 shows an exemplary three-dimensional rope network with a support mast 15 configured as a center mast. Tensioned ropes 3 converge at a top point 16 of the support mast 15. The ropes are retained at the foot points 17 with ground tensioners 18. The ground tensioner 18 includes a pipe section 2, with a rope tensioner 1 according to the invention (not shown in FIG. 1) arranged in the interior space 10 of the pipe section 2. The ropes 3 can also be tensioned by placing an additional rope tensioner 1 configured as a hollow body at the top point 16.

Figure 2:
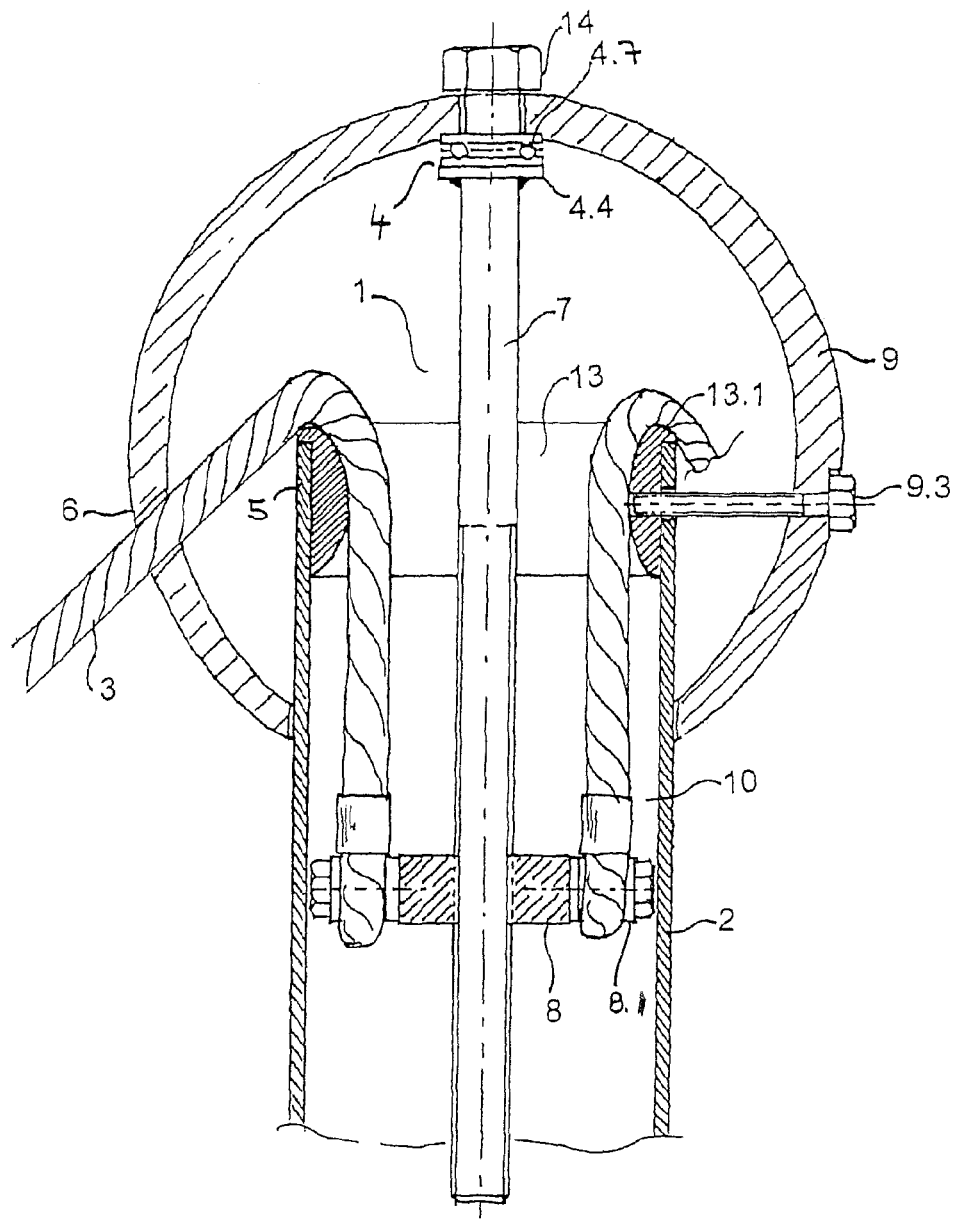
FIG. 2 shows a rope tensioner with a support arranged in a hollow sphere.

FIG. 2 illustrates a rope tensioner according to the invention which is arranged inside an interior space 10 of a pipe section 2 and inside a spherical hollow body 9. A tensioning rod 7 extends through the wall of the hollow body 9 into the interior space 10 of the pipe section 2. A rope receiving member 8 is arranged on the tensioning rod 7. The ends of the ropes 3 are attached with fastening elements 8.1 (as shown in FIGS. 2 and 3) in the rope receiving member 8. The rope receiving member 8 is screwed onto the tensioning rod 7 which has an exterior thread. The rope receiving member 8 located inside the pipe section can be moved with a tensioning element 14, which is accessible from outside the hollow body 9 and rotates the tensioning rod 7, thereby exerting a pulling force on the ropes 3, i.e., a tensioning process takes place. A support 4 with a support plate 4.4 and a ball thrust bearing 4.7 produces the necessary counterpressure. The ropes rest on a rope-protective pad 13 which has a surface formed as a radius 13.1. The pad 13 is placed on a pipe section end 5 similar to a sleeve. The hollow body 9 and the pad 13 are secured on the pipe section 2 with mounting screws 9.3.

FIG. 3 shows in cross-section another embodiment of the rope tensioner 1 according to the invention implemented as a support 4 located outside the pipe section 5, with the ball thrust bearing 4.7 and the tensioning element 14 of the tensioning rod 7. The support 4 is held in place by a bracket 4.2. The two legs 4.3 of the bracket 4.2 are attached to the pipe section 2 with a mounting screw 4.1. Rotation of the tensioning element 14 of the tensioning rod 7 causes a displacement of the rope receiving member 8, subjecting the ropes to a pulling force. The support plate 4.4 of the support in conjunction with the bracket 4.2 produces the required counterforce for tensioning the ropes 3. The pad 13 is protects the ropes by gently supporting the ropes 3 at the deflection point.

FIG. 4 shows illustrates another arrangement of a support 4 of the rope tensioner 1. The support 4 is connected to the pad 13 with mounting screws 4.1. The support plate 4.4 of the support 4, in conjunction with a base plate 4.5 and the thrust ball bearing 4.7, produce the counterforce required for tensioning the ropes 3 when the tensioning element 14 and hence also the tensioning rod 7 are rotated. The rope receiving member 8 disposed in the interior space 10 of the pipe section 2 moves downward when the tensioning element 14 and thus also the tensioning rod 7 rotate, thereby exerting a pulling force on the ropes 3 attached to the rope receiving member 8.

FIGS. 11a. and 11b show in a top view and in cross-section an exemplary diagram of the base plate 4.5. A tensioning element opening 12 is arranged in the center of the base plate in which the tensioning element 14 of the tensioning rod 7 is supported. Mounting screws 4.1 are inserted into bores 4.6 of the base plate 4.5.

FIG. 5 shows once more the rope tensioner 1 illustrated in FIG. 4, here with a cover in form of a spherical hollow body 9. The hollow body consists of a center part 9.1 and a cover 9.2. The cover 9.2 covers a tensioning opening 11. The tensioning element 14 of the tensioning rod 7 can be operated directly through the tensioning opening 11 after the cover 9.2 has been removed. The center part 9.1 of the hollow body 9 includes rope openings 6 through which the ropes are routed. The center part 9.1 and the rope-protective pad 13 are matched to one another for form-fitting engagement. The embodiment of the rope tensioner 1 according to the invention can be employed in particular at the top point 16 of a support mast 15.

The diagrams of FIG. 6a and FIG. 6b show in a cross-sectional view and in a top view an embodiment of a rope-protective pad 13. The exemplary embodiment of the rope-protective pad 13 shows a radius 13.1 and threaded bores 13.3 which are configured to receive the mounting screws 4.1 of the support 4. The pipe section receptacle 13.2 of pad 13 is placed onto the end 5 of the pipe section. The curved surface of the pad 13 provides a gentle contact surface for the ropes 3.

FIG. 7 shows in a perspective view the cover of the rope tensioners 1 with the spherical hollow body 9 according to the invention. The rope openings 6, through which the ropes enter and exit, are disposed in the center part 9.1 of the hollow body 9. The ropes 3 rest on the rope-protective pad 13. The cover 9.2 covers the tensioning opening 11, through which the tensioning element 14 of the tensioning rod 7 can be operated. The cover of the rope tensioner 1 can be employed in particular at the top point 16 of the support mast 15.

FIG. 8 shows another embodiment of the rope tensioner 1 according to the invention. The hollow body 9 with the connected pipe section 2 is particularly suited as a framework point 19. Several framework pipes 19.1 converge in the framework point 19. In addition, ropes 3 are attached which must still be tensioned. The tensioning member 14 of the tensioning rod 7 can be operated through the tensioning opening 11 of the hollow body 9. By rotating a nut 14.1, the rope receiving member 8 is moved by the tensioning rod 7 toward the hollow body 9, producing a pulling force. The wall of the hollow bodied 9 produces the required counterforce for generating the required tension.

FIG. 9 schematically illustrates another embodiment of the rope tensioner 1 according to the invention. The support 4 with the ball thrust bearing 4.7 is arranged in the interior space 10 of the pipe section 2, with the tensioning rod 7 rotatably extending through the ball thrust bearing 4.7. The bracket 4.2 of the support 4 is fixedly connected with the wall of the pipe section 2. The support plate 4.4 is affixed to the tensioning rod 7. By rotating the tensioning rod 7 with the tensioning member 14, the rope receiving member 8 located above the support 4, as viewed toward the pipe section end 5, moves on the exterior thread of the tensioning rod 7 in the tensioning direction.

FIG. 10 shows another embodiment of the rope tensioner 1 according to the invention. This embodiment can be employed, in particular, in the bottom tensioner 18 in the area of the foot points 17 (FIG. 1). A mounting plate 10.1 attached in the interior space 10 of the pipe section 2 has a bore with an interior thread, into which the tensioning rod 7 is screwed. The rope receiving member 8 moves in the tensioning direction when the tensioning element 14 of the tensioning rod 7 is operated. The pipe section end 5 is here also provided with a rope-protective pad 13.

LIST OF REFERENCE SYMBOLS

1 Rope tensioner
2 Pipe section
3 Rope
4 Support
4.1 Mounting screw
4.2 Bracket
4.3 Leg
4.4 Support plate
4.5 Base plate
4.6 Bore
4.7 Ball thrust bearing
5 End of pipe section
6 Rope opening
7 Tensioning rod
8 Rope receiving member
9 Hollow body
9.1 Center part
9.2 Cover
9.3 Fastening screw
10 Interior space
10.1 Mounting plate
11 Tensioning opening
12 Opening of tensioning member
13 Pad
13.1 Radius
13.2 Receptacle for pipe section
13.3 Threaded bore
14 Tensioning element
14.1 Nut
15 Support master
16 Top point
17 Foot point
18 Ground tensioner
19 Framework point
19.1 Framework pipe

The invention claimed is:

1. A rope tensioning device for rope networks, the device comprising
   a rope tensioner,
   ropes of a rope network, and
   a pipe section,
   wherein the rope tensioner for ropes of the rope network is disposed primarily in an interior space of the pipe section,
   wherein the rope tensioner comprises a support, a rotationally supported tensioning rod extending through the support, and a rope receiving member movably arranged on the tensioning rod, and
   wherein the rope receiving member is arranged in the interior space of the pipe section and receives ropes of the rope network.

2. The rope tensioning device according to claim 1, wherein the support and the tensioning rod of the rope tensioner are arranged outside and partially outside of the pipe section, respectively, in a region of an end of the pipe section.

3. The rope tensioning device according to claim 2, wherein the support is secured on the end of the pipe section.

4. The rope tensioning device according to claim 1, wherein a tensioning element of the tensioning rod is arranged outside the pipe section.

5. The rope tensioning device according to claim 1, wherein the tensioning rod comprises an exterior thread, on which the rope receiving member, which includes an interior thread, is arranged for rotational movement.

6. The rope tensioning device according to claim 1, wherein the rope receiving member comprises fastening elements for ends of the ropes of the rope network.

7. The rope tensioning device according to claim 1, wherein the support is attached on an interior wall of a hollow body placed on the pipe section.

8. The rope tensioning device according to claim 1, wherein an end of the pipe section is covered with a hollow body having rope openings, wherein the hollow body is made as a single part or assembled from several parts.

9. The rope tensioning device according to claim 8, wherein the hollow body comprises a tensioning opening which can be closed with a cover.

10. The rope tensioning device according to claim 4, wherein the tensioning element of the tensioning rod is arranged in a hollow body outside the interior space of pipe section connected to the hollow body.

11. The rope tensioning device according to claim 2, wherein the ropes of the rope network exit the end of the pipe section and rest on a pad.

12. The rope tensioning device according to claim 1, wherein the rope tensioner for ropes of the rope network is arranged on a mast top of a center mast configured as a mast pole.

13. The rope tensioning device according to claim 12, wherein the support is placed on and attached to the mast top of the mast pole, wherein the tensioning rod with the movable rope receiving member is rotatably supported in the support.

14. The rope tensioning device according to claim 12, wherein the rope tensioner comprises a hollow body with rope openings which is placed on the mast top of the mast pole and secured thereon, and the tensioning rod extending vertically through the hollow body into the mast pole.

* * * * *